United States Patent
Zhang et al.

(10) Patent No.: US 11,971,326 B2
(45) Date of Patent: Apr. 30, 2024

(54) DYNAMIC SIMULATION TEST PLATFORM AND METHOD FOR ULTRA-HIGH-SPEED EVACUATED TUBE MAGNETIC LEVITATION (MAGLEV) TRANSPORTATION

(71) Applicant: Southwest Jiaotong University, Chengdu (CN)

(72) Inventors: Weihua Zhang, Chengdu (CN); Zigang Deng, Chengdu (CN); Haiquan Bi, Chengdu (CN); Wenxiang Zhou, Chengdu (CN); Jun Guo, Chengdu (CN); Zhigen Xu, Chengdu (CN); Yinchuan Li, Chengdu (CN); Le Liang, Chengdu (CN)

(73) Assignee: Southwest Jiaotong University, Chengdu (CN)

( * ) Notice: Subject to any disclaimer, the term of this patent is extended or adjusted under 35 U.S.C. 154(b) by 0 days.

(21) Appl. No.: 18/483,481

(22) Filed: Oct. 9, 2023

(65) Prior Publication Data
US 2024/0035930 A1 Feb. 1, 2024

Related U.S. Application Data

(63) Continuation of application No. PCT/CN2023/106748, filed on Jul. 11, 2023.

(30) Foreign Application Priority Data
Oct. 28, 2022 (CN) .......................... 202211334288.7

(51) Int. Cl.
*G01M 17/08* (2006.01)
*B61B 13/08* (2006.01)
(Continued)

(52) U.S. Cl.
CPC ............. *G01M 17/08* (2013.01); *B61B 13/08* (2013.01); *B61B 13/10* (2013.01); *B61B 13/122* (2013.01); *B61C 15/045* (2013.01)

(58) Field of Classification Search
CPC ......... B61B 13/06; B61B 13/08; B61B 13/10; B61B 13/122; G01M 17/08; B61C 15/045; B60L 13/04
(Continued)

(56) References Cited

U.S. PATENT DOCUMENTS

| | | | | |
|---|---|---|---|---|
| 5,253,591 A | * | 10/1993 | Rote ....................... | B60L 13/10 104/139 |
| 5,513,573 A | * | 5/1996 | Sutton ..................... | B61B 13/10 104/138.1 |

(Continued)

FOREIGN PATENT DOCUMENTS

| | | | |
|---|---|---|---|
| CH | 716037 A2 * | 10/2020 | ............. B60L 13/03 |
| CN | 101191759 A | 6/2008 | |

(Continued)

OTHER PUBLICATIONS

Yingyu Rao, "Study on the Coupling Effect of Temperature and Pressure of High-Temperature Superconducting Pinning Maglev System in Low-Vacuum Tube", Chinese Master's Theses Full-text Database Engineering Science and Technology II, No. 5, 2022, Entire document.

(Continued)

*Primary Examiner* — Zachary L Kuhfuss (57) ABSTRACT

A dynamic simulation test platform for ultra-high-speed evacuated tube magnetic levitation (maglev) transportation includes an evacuated tube having a transition section and a vacuum section, a vacuum maintaining system, a motor supporting platform, and a model train. One end of the evacuated tube is provided with a first isolation door, and the other end is closed. A second isolation door is provided (Continued)

inside the evacuated tube. The vacuum maintaining system is connected to the transition section and the vacuum section. The motor supporting platform is provided in the evacuated tube and extends outside the transition section. The motor supporting platform is provided with a stator winding and a permanent-magnet track. A mover and a cryogenic dewar are provided at a bottom of the model train. The cryogenic dewar is provided with a superconducting bulk. A test method using the test platform is further provided.

9 Claims, 3 Drawing Sheets

(51) Int. Cl.
*B61B 13/10* (2006.01)
*B61B 13/12* (2006.01)
*B61C 15/04* (2006.01)

(58) Field of Classification Search
USPC ............................ 104/138.1, 281, 155
See application file for complete search history.

(56) References Cited

U.S. PATENT DOCUMENTS

| | | | |
|---|---|---|---|
| 11,366,038 B1* | 6/2022 | Deng | G01H 1/12 |
| 2016/0121908 A1* | 5/2016 | Ahmad | B65G 51/02 |
| | | | 406/50 |
| 2020/0377247 A1* | 12/2020 | Vassberg | B65B 31/04 |
| 2021/0001729 A1* | 1/2021 | Fang | B60L 7/28 |
| 2022/0115965 A1 | 4/2022 | Zheng et al. | |

FOREIGN PATENT DOCUMENTS

| | | |
|---|---|---|
| CN | 101962019 A | 2/2011 |
| CN | 105151051 A | 12/2015 |
| CN | 105172803 A | 12/2015 |
| CN | 206248342 U | 6/2017 |
| CN | 107694851 A | 2/2018 |
| CN | 108313073 A | 7/2018 |
| CN | 108501963 A | 9/2018 |
| CN | 208164974 U | 11/2018 |
| CN | 209553184 U | 10/2019 |
| CN | 110901410 A | 3/2020 |
| CN | 211207766 U | 8/2020 |
| CN | 211809579 U | 10/2020 |
| CN | 112240834 A | 1/2021 |
| CN | 112849167 A | 5/2021 |
| CN | 113335314 A | 9/2021 |
| CN | 114154230 A | 3/2022 |
| CN | 115056804 A | 9/2022 |
| CN | 115389233 A | 11/2022 |
| JP | 2014119336 A | 6/2014 |
| KR | 20200049335 A | 5/2020 |
| WO | 2019114395 A1 | 6/2019 |

OTHER PUBLICATIONS

Jiayuan Song et al., "Research on aerodynamic and thermal characteristics of subsonic evacuated tube maglev system", Acta Aerodynamica Sinica, vol. 40, No. 2, 2022, pp. 115-121.

Zigang Deng et al., "Present Situation and Prospect of Evacuated Tube Transportation System", Journal of Southwest Jiaotong University, 2019, vol. 54, No. 5, pp. 1063-1072.

Yihuan Xu et al., "The evaporation characteristics of liquid nitrogen coolant of HTS maglev in a low-pressure environment", Vacuum, vol. 129, Jul. 2016, pp. 49-54.

Xinyu Ye, "Research and Application of High Temperature Superconductors Maglev Transportation System", Electrical Engineering Materials, 2018, No. 4, pp. 27-31.

* cited by examiner

DYNAMIC SIMULATION TEST PLATFORM AND METHOD FOR ULTRA-HIGH-SPEED EVACUATED TUBE MAGNETIC LEVITATION (MAGLEV) TRANSPORTATION

CROSS-REFERENCE TO RELATED APPLICATIONS

This application is a continuation of International Patent Application No. PCT/CN2023/106748, filed on Jul. 11, 2023, which claims the benefit of priority from Chinese Patent Application No. 202211334288.7, filed on Oct. 28, 2022. The content of the aforementioned application, including any intervening amendments thereto, is incorporated herein by reference in its entirety.

TECHNICAL FIELD

This application relates to high-speed operation test, and more particularly to a dynamic simulation test platform and method for ultra-high-speed evacuated tube magnetic levitation (maglev) transportation.

BACKGROUND

In recent years, some progress has been made to the high-temperature superconducting (HTS) pinning magnetic levitation technology in terms of the improvement of loading capacity and dynamic levitation stability, and the research and development of application prototypes. However, a test platform suitable for researching the basic scientific problems and common key technologies involving multiple disciplines (e.g., maglev transportation aerodynamics, levitation and guidance, traction and control, high-power rail electromagnetic propulsion, and tube-rail-train-airflow-thermal coupling) under the multi-state coupling condition is still absent in the prior art.

SUMMARY

In view of the deficiencies in the prior art, this application provides a dynamic simulation test platform and method for ultra-high-speed evacuated tube magnetic levitation (maglev) transportation.

Technical solutions of this application are described as follows.

This application provides a dynamic simulation test platform for evacuated tube magnetic levitation (maglev) transportation, comprising:

an evacuated tube;
a vacuum maintaining system;
a motor supporting platform; and
a test train;
wherein a first end of the evacuated tube is provided with a first isolation door, and a second end of the evacuated tube is closed; a second isolation door is provided inside the evacuated tube; and the second isolation door is configured to divide the evacuated tube into a transition section and a vacuum section;
the vacuum maintaining system is connected to the transition section and the vacuum section;
the motor supporting platform is provided in the evacuated tube, and extends out of the transition section; and the motor supporting platform is provided with a stator and a permanent-magnet track;
a mover and a cryogenic dewar are provided at a bottom of the test train; a superconducting bulk is provided inside the cryogenic dewar; the stator is configured to be energized to generate a driving force with the mover to drive the test train forward; and the superconducting bulk is configured to cooperate with the permanent-magnet track to generate a levitation force; and the dynamic simulation test platform is operated through steps of:
performing a manual inspection on hardware equipment; and vacuumizing the evacuated tube to reach a first target pressure;
starting an energy storage device of a traction-braking system to perform energy storage until the energy storage is completed;
feeding liquid nitrogen to the cryogenic dewar; connecting the test train to the mover after completing the feeding of liquid nitrogen; transferring the test train and the mover to the transition section; and closing the first isolation door;
opening a first connecting valve between the transition section and the vacuum maintaining system; and vacuumizing the transition section to reach a second target pressure;
opening the second isolation door; opening a second connecting valve between the vacuum section and the vacuum maintaining system; and adjusting a pressure in the evacuated tube to the first target pressure and keeping the pressure in the evacuated tube at the first target pressure;
starting a test and communication system to perform time synchronization and acquisition of test data;
starting the traction-braking system for controlling the test train to accelerate, travel at a constant speed, and decelerate;
saving the test data; turning off the traction-braking system and the test and communication system in turn;
controlling a multifunctional testing vehicle to return the test train to the transition section;
closing the second isolation door; restoring a pressure of the transition section to atmospheric pressure; opening the first isolation door; and moving the test train out of the transition section to a preparation section;
if there is no other test to be conducted in a preset period of time, closing the first connecting valve and the second connecting valve; and closing the vacuum maintaining system to restore the pressure in the evacuated tube; and
closing the dynamic simulation test platform when a temperature in the evacuated tube reaches an ambient temperature.

In an embodiment, the motor supporting platform is provided with two motor brackets; the motor supporting platform is fixedly connected to the evacuated tube; one of the two motor brackets is disposed on a first side of the motor supporting platform, and the other of the two motor brackets is disposed on a second side of the motor supporting platform; a first gap is provided between the two motor brackets; the number of the stator is two; one of two stators is provided on a sidewall of one of the two motor brackets, and the other of the two stators is provided on a sidewall of the other of the two motor brackets; the two stators are located in the first gap; the mover is located between the two stators; and a second gap is provided between the mover and each of the two stators.

In an embodiment, each of the two stators comprises a stator core and a stator winding; the stator core is fixedly connected to a corresponding one of the two motor brackets;

the stator winding is fixedly connected to the stator core; and the stator winding is located in the first gap.

In an embodiment, the dynamic model test platform further includes a position detecting device; wherein the position detecting device is provided on one of the two motor brackets and located in the first gap.

In an embodiment, the mover is made of permanent magnets.

In an embodiment, the transition section is made of a transparent material; and the vacuum section is made of a metal material.

In an embodiment, the dynamic model test platform further includes three bases; wherein the three bases are fixedly connected to the ground; an end of each of the three bases away from the ground is provided with a tube supporting seat; two of three tube supporting seats are connected to the first isolation door and the second isolation door, respectively; and a remaining one of the three tube supporting seats is fixedly connected to a closed end of the evacuated tube.

In an embodiment, the permanent-magnet track is arranged in a Halbach array.

In an embodiment, the step of "performing a manual inspection on hardware equipment; and vacuumizing the evacuated tube to reach a first target pressure" is performed through steps of:
- at 48 h before test, performing the manual inspection on the hardware equipment;
- at 24 h before the test, closing the first isolation door; starting the vacuum maintaining system to vacuumize the evacuated tube until the pressure in the evacuated tube reaches the first target pressure; and keeping the evacuated tube at the first target pressure; and
- at 2 h before the test, based on a monitoring system, setting test parameters; checking equipment data; and setting an interlocked operation according to test requirements.

Compared to the prior art, this application has the following beneficial effects.
(1) In this application, the superconducting pinning effect is generated by the superconducting bulk and the permanent-magnet track, thereby realizing the passive stable levitation and guiding function of the test train. Compared with the traditional "8"-shaped superconducting electrodynamic suspension, the complexity of the levitation and guiding of the test train is greatly reduced, and the stability and reliability of the system operation are improved.
(2) The vacuum maintenance system vacuumizes the evacuated tube. The first isolation door and the second isolation door change gas pressure in the evacuated tube, making the test train run under different gas pressures, effectively reducing the air resistance, improving the aerodynamic noise, and realizing the test under different gas pressures. This application completes the comprehensive experimental research and validation of rail transportation system in different operating environments under different gas pressures and at different operating speeds, and realizes the research on the basic scientific problems and common key technologies based on multi-disciplinary intersection of wheel-rail (magnetic rail) dynamics, aerodynamics, levitation and guidance, traction and control, high-power rail electromagnetic propulsion, and pipeline-rail-train-airflow-thermal coupling under the condition of multi-state coupling.

Other features and advantages of the present disclosure will be described below. Some features and advantages will become apparent from the specification or be understood by implementing the embodiments. The objects and other advantages of the present disclosure may be obtained by the structure indicated in the specification, the appended claims, and the accompanying drawings.

BRIEF DESCRIPTION OF THE DRAWINGS

In order to illustrate the technical solutions of embodiments of the present disclosure more clearly, the accompanying drawings in the embodiments will be briefly described below. It should be understood that the accompanying drawings merely show some embodiments of the present disclosure, which are not intended to limit the disclosure. For those skilled in the art, other drawings may also be obtained according to the drawings provided herein without paying creative efforts.

In the figures: 1—test train; 2—mover; 3—connecting mechanism; 4—cryogenic dewar; 5—motor bracket; 6—evacuated tube; 7—position detecting device; 8—motor supporting platform; 9—permanent-magnet track; 10—stator core; 11—stator winding; 12—stator supporting frame; 13—first isolation door; 14—transition section; 15—tube supporting seat; 16—base; 17—preparation section; 18—vacuum maintaining system; 19—second isolation door; 20—vacuum section; 21—superconducting bulk; 22—first gap; 23—second gap; 24—first connecting valve; and 25—second connecting valve.

DETAILED DESCRIPTION OF EMBODIMENTS

The technical solutions of the disclosure will be described in detail below with reference to the drawings in the embodiments to make the technical solutions, objects and advantages of the disclosure clearer. Obviously, described below are merely some embodiments of the disclosure, which are not intended to limit the disclosure. It should be noted that the components of the embodiments shown in the drawings herein may be arranged and designed in different forms. Accordingly, the following detailed description is merely illustrative, and is not intended to limit the scope of the disclosure. For those skilled in the art, other embodiments obtained based on these embodiments without paying creative efforts should fall within the scope of the disclosure defined by the appended claims.

It should be noted that similar reference signs and letters indicate similar items in the drawings. Thus, once an element has been defined in one drawing, there is no need to further define and explain this element in subsequent drawings. In addition, the terms "first" and "second" are merely descriptive, and cannot be understood as indicating or implying relative importance.

Embodiment 1

Figure 1:
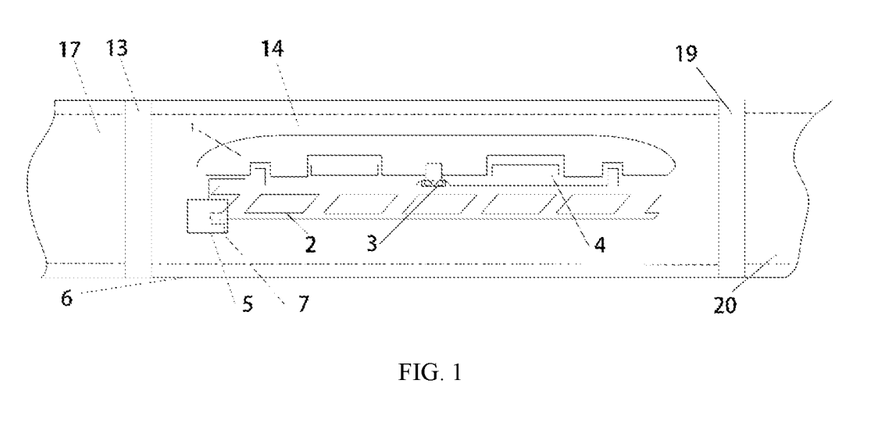
FIG. 1 schematically shows a partial structure of a dynamic simulation test platform for ultra-high-speed evacuated tube magnetic levitation transportation according to Embodiment 1 of the present disclosure.

As shown in FIG. 1, a dynamic model test platform for ultra-high-speed evacuated tube magnetic levitation (maglev) transportation includes an evacuated tube 6, a vacuum maintaining system 18, a motor supporting platform 8, and a test train 1. The first end of the evacuated tube 6 is provided with a first isolation door 13, and the second end of the evacuated tube 6 is closed. Specifically, the tail end of the evacuated tube 6 is flanged and sealed with the pipe section by a vessel header. A second isolation door 19 is provided inside the evacuated tube 6. The second isolation door 19 is configured to divide the evacuated tube 6 into a transition section 14 and a vacuum section 20. The vacuum maintaining system 18 is connected to the transition section 14 and the vacuum section 20, respectively. The motor supporting platform 8 is provided in the evacuated tube 6 and extends out of the transition section 14. The motor supporting platform 8 is provided with two stators and a permanent-magnet track 9. Specifically, the permanent-magnet track 9 is arranged in a Halbach array. The bottom of the test train 1 is provided with a mover 2 and a cryogenic dewar 4. In an embodiment, the bottom of the test train 1 is provided with a connecting structure. The mover 2 and the cryogenic dewar 4 are provided on the connecting structure. In an embodiment, the connecting structure may be a bogie in the prior art. A superconducting bulk 21 is provided inside the cryogenic dewar 4. The stator is configured to be energized to generate a driving force with the mover 2 to drive the test train 1 forward. The superconducting bulk 21 is configured to cooperate with the permanent-magnet track 9 to generate a repulsive force. It should be noted that the cryogenic dewar 4 is used to hold liquid nitrogen for cooling the superconducting bulk 21. The superconducting bulk 21 enters a superconducting state in a low temperature environment, and produces a superconducting pinning effect with the permanent-magnet track 9, realizing the passive stable levitation and guiding function of the test train 1. Compared with the traditional "8"-shaped superconducting electrodynamic suspension, the high-temperature superconducting bulk 21 used in this disclosure cooperates with the permanent-magnet track 9 to provide levitation and guidance, which can greatly reduce the complexity of the levitation and guidance of the test train 1, and improve the stability and reliability of the system operation. In this disclosure, the vacuum maintaining system 18 vacuumizes the evacuated tube 6. The first isolation door 13 and the second isolation door 19 change gas pressure in the evacuated tube 6, allowing the test train 1 to run under different gas pressures, effectively reducing the air resistance, improving the aerodynamic noise, and realizing the test under different gas pressures. This disclosure completes the comprehensive experimental research and validation of rail transportation system in different operating environments under different gas pressures and at different operating speeds, and realizes the research on the basic scientific problems and common key technologies based on multi-disciplinary intersection of wheel-rail (magnetic rail) dynamics, aerodynamics, levitation and guidance, traction and control, high-power rail electromagnetic propulsion, and pipeline-rail-train-airflow-thermal coupling under the condition of multi-state coupling.

Figure 2:
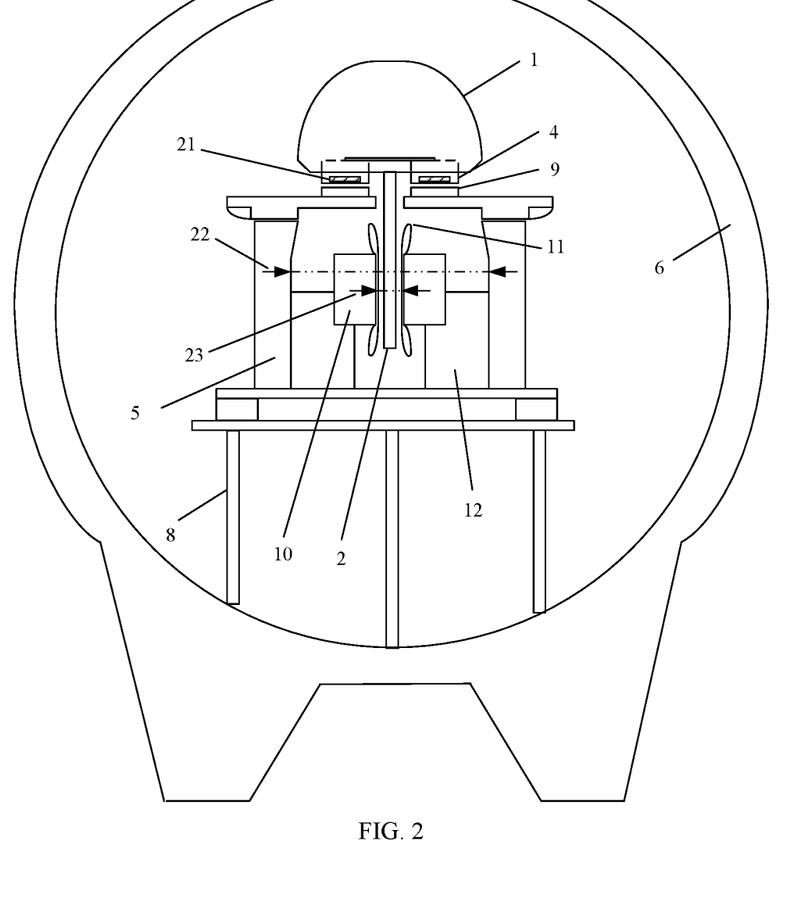
FIG. 2 is a sectional view of the dynamic simulation test platform according to Embodiment 1 of the present disclosure.

As shown in FIG. 2, the motor supporting platform 8 is provided with two motor brackets 5. The motor supporting platform 8 is fixedly connected to the evacuated tube 6. The two motor brackets 5 are respectively disposed on both sides of the motor supporting platform 8. A first gap 22 is provided between the two motor brackets 5. The number of the stator is two. The two stators are disposed on the sidewall of the motor bracket 5, respectively. The two stators are disposed in the first gap 22. The mover 2 is located between the two stators. A second gap 23 is provided between the mover 2 and each of the two stators. In this way, a bilaterally linear drive motor provides the driving force for the test train 1. Moreover, the bilateral drive can strengthen the driving force of the mover 2, so that the mover 2 can reach a high speed in a short distance.

In this disclosure, the length of the evacuated tube 6 is not larger than 1.62 km, and the diameter of the evacuated tube 6 is not less than 3.0 m. The length of the section of the motor supporting platform 8 extending outside the transition section 14 is 17 m and recorded as the preparation section 17. The length of the transition section 14 is 20 m, and the length of the vacuum section 20 is 1600 m. The vacuum section 20 includes a plurality of pipe sections welded together. In an embodiment, the length of each of the pipe sections is 20 m, and the number of the pipe sections is 81.

A stator supporting frame 12 is provided in the joint between the stator and the motor bracket 5. The stator supporting frame 12 is made of aluminum. The stator includes a stator core 10 and a stator winding 11. The stator core 10 is fixedly connected to a corresponding one of the two motor brackets 5, the stator winding 11 is fixedly connected to the stator core 10, and the stator winding 11 is disposed in the first gap 22. The mover 2 is made of permanent magnets. In the present disclosure, according to the position of the test train 1 and predetermined rules, the stator winding 11 is intermittently energized to generate a magnetic field and repel the permanent magnets of the mover 2, thereby driving the test train 1. Under the action of the bilateral magnetic field, the high-temperature superconducting magnetic levitation test train 1 with a mass of 200 kg reaches a maximum speed of 1500 km/h.

Further, in order to obtain the position of the test train 1 at each moment, the dynamic model test platform further includes a position detecting device 7. The position detecting device 7 is provided on one of the two motor brackets 5. The position detecting device 7 is located in the first gap 22. In an embodiment, the position detecting device 7 detects the position of the mover 2, and then the position is converted to the position in which the test train is located, thereby detecting the position of the test train 1. In an embodiment, the position detecting device 7 may be a laser rangefinder. The mover 2 is provided with projections arranged in a predetermined rule to exclude the influence caused by high speed. For example, a first group of projections are arranged in different spacings, a second group of projections are arranged in same spacings, and a third group of projections are arranged in different spacings. The spacings in the first group of projections are all smaller than the spacings used in the third group of projections. As a result, when detecting the distance signals, the distance changes having different cycles caused by the first projection group first appear; the distance changes caused by the second projection group have a relatively stable cycle; and then the distance changes with different cycles caused by the third projection group appear. The cycles of the distance changes caused by the first projection group are smaller than the cycles of the distance changes caused by the third projection group. Equipment errors are sequentially eliminated during the high-speed running, and the moving state of the test train 1 in the whole test process is indirectly determined.

In order to strengthen the structure of the evacuated tube 6 and observe the state of the test train 1 and other equipment in the preparation stage in real time, the transition section 14 of the evacuated tube 6 is made of a transparent material, and the vacuum section 20 of the evacuated tube 6 is made of a metal material. Specifically, in an embodiment, the metal material is steel, and the transparent material is transparent tempered borosilicate glass. The thickness of the tempered borosilicate glass is 20 mm. The tempered borosilicate glass is provided with T-shaped stiffening ribs at every 2 m of the tempered borosilicate glass. A sealing ring is provided between the tempered borosilicate glass and the stiffening rib for sealing. The transition section 14 can effectively maintain the long-term low-pressure state of the pipe, so that the test train 1 transitions between atmospheric pressure and low-pressure, simulating the function of the transition cabin of the station during use.

Meanwhile, in order to support the vacuum maintaining system 18, the dynamic model test platform further includes three bases 16. Each of the three bases 16 is fixedly connected to the ground. An end of each of the three bases 16 away from the ground is provided with a tube supporting seat 15. Two of the three tube supporting seats 15 are connected to the first isolation door 13 and the second isolation door 19, respectively. A remaining one of the three tube supporting seats 15 is fixedly connected to a closed end of the evacuated tube 6.

Figure 3:
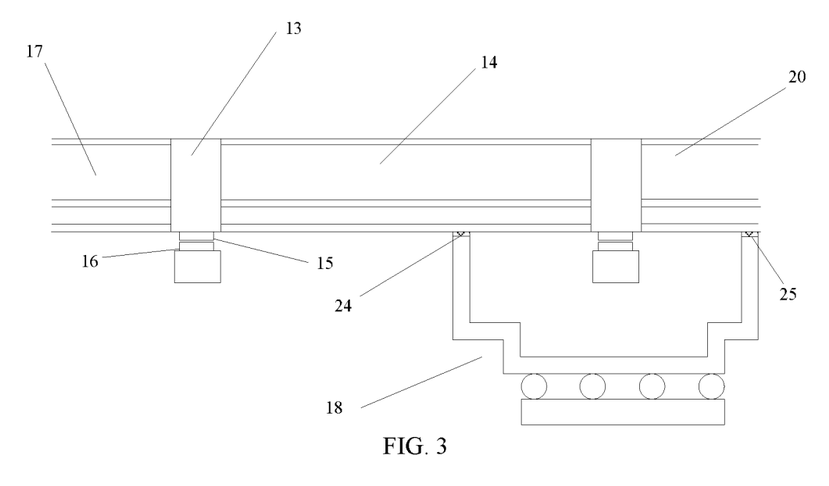
FIG. 3 schematically shows a structure of a transition section according to Embodiment 1 of the present disclosure.

Referring to FIG. 3, in order to make the pressure within the evacuated tube 6 continuously adjust and keep in the range of 0.005~1.0 atm, the vacuum maintaining system 18 is the vacuum pump three-stage dry system. The pressure of the tube is 0.005~1.0 atm. The time needed for adjusting the pressure from 1.0 atm to 0.005 atm is ≤24 h. The control system is configured with independent electric control cabinet, and PLC+HMI control and one-key start function, which can optimize pumping speed. After reaching the target pressure, the pumping speed is reduced or the pump is gradually stopped to maintain the vacuum state, thereby achieving the effect of energy saving. The pressure in the tube is continuously adjustable within the range of 0.0051.0 atm. Each vacuum pump needs to be equipped with a frequency converter, allowing the vacuum pumps to start together at atmospheric pressure. Each vacuum pump should be equipped with a solenoid-pneumatic switching valve at the inlet or exhaust port of the vacuum pump, thereby quickly opening and closing the vacuum pump. The dry system should be equipped with a pressure control assembly to regulate the frequency of the vacuum pump or control the solenoid-pneumatic switching valve or adjust the pressure of the exhaust side. The dry system is sealed by metal, which can withstand a large amount of dust and ensure reliable sealing in the environment containing impurities. The Programmable Logic Controller (PLC) of the electronic control system should adopt world first-class brand equipment. The electronic control communication method of the vacuum maintaining system adopts Profinet and is connected to the Profinet port of the control system. The unit PLC is connected to the frequency converter of the vacuum pump to accept the command of the upper computer, control the vacuum pump and regulate the pressure, and collect and transmit the temperature/current/frequency/failure/alarm signals of the vacuum pump to the upper computer at the same time. The unit PLC collects the vacuum gauge signal and control the feedback signals of valve switch and valve position. The unit controls remotely and locally a human-machine interface, which displays the operating status of the vacuum pump and valve, vacuum gauge pressure value, and operating frequency and operating time of each pump.

Embodiment 2

The dynamic simulation test platform is operated through the following steps.

The vacuum section 20 is pumped, and the gas pressure in the vacuum section 20 is maintained at a preset gas pressure for the test.

The test train 1 is subjected to debugging in the preparation section 17.

After finishing the debugging, the first isolation door 13 is opened, and the test train 1 is driven under the cooperation of the stator and the mover 2 to enter the transition section 14.

The first isolation door 13 is closed, and the vacuum maintaining system 18 is used to perform air extraction on the transition section 14 and maintain the gas pressure in the transition section 14 at the first gas pressure. In an embodiment, the first gas pressure is higher than the preset gas pressure for test.

The second isolation door 19 is opened, and the test train 1 is driven into the vacuum section 20 through the stator in cooperation with the mover 2. The vacuum section 20 is performed with the air extraction, and the gas pressure in the vacuum section 20 is maintained at the preset gas pressure for test.

The test data is collected in accordance with the preset running speed.

In this embodiment, by testing the test train 1 driving into the vacuum section 20 in the manner described above, the structural strength of the transition section 14 can be carefully considered. Through the intermediate transition of the first gas pressure value, the gas pressure to which the transition section 14 is subjected can be reduced. Moreover, the state observation of the test train 1 and other equipment is achieved through the transition section 14, and the time required for the test train 1 to travel from the outside into the vacuum section 20 is shortened, and the time required to maintain the vacuum section 20 at the designed pressure value is reduced.

Embodiment 3

The dynamic simulation test platform is operated through the following steps.

(S1) A manual inspection is performed on hardware equipment. The evacuated tube 6 is vacuumized to reach a first target pressure.

(S11) At 48 h before the test, the manual inspection is performed on the hardware equipment.

In this embodiment, the manual inspection of the hardware equipment includes: 1. checking the condition of the system equipment and eliminating abnormalities, such as ensuring that the first isolation door 13 and pointer pressure gauge are normal; whether the cables and wires are flooded or not; and whether there is a disaster such as obvious settlement of the foundation; 2. confirming that the second isolation door 19 is open; the first isolation door 13 is closed; the pipes and valves of the vacuum maintaining system 18 are in normal condition; the test train 1 and on-board test equipment of the test train 1 is intact; the line switch of the driving-braking system (including power electronic switch) is normal; the lubrication and cooling status of the energy storage system is normal; the test and communication system is energized and reset; the environmental control system and the integrated monitoring system is activated; the multifunctional testing vehicle runs to the parking position at the end; and the test conditions in the pipes have met the requirements; and cleaning up the test area.

It should be noted that the line switches for the driving-braking system refers to the electrical switches such as the mover 2 and the stator windings, as well as the switches for the complete system of the cryogenic dewar. The energy storage system, the test and communication system, the environmental control system and the integrated monitoring system are the relevant safeguard systems of the test train 1, respectively.

(S12) At 24 hours before the test, the first isolation door 13 is closed. The vacuum maintaining system 18 is activated to vacuumize the evacuated tube 6 until the pressure in the evacuated tube 6 reaches the second target pressure, and the pressure in the evacuated tube 6 is maintained at the second target pressure to ensure that the pressure fluctuation is less than 5%.

(S13) At 2 hours before the test, based on the integrated monitoring system, the relevant test parameters are set, the relevant equipment data is checked, and an interlocked operation is set according to the test requirements.

(S2) The energy storage device of the traction-braking system is started to store energy until the energy storage is completed.

(S3) The cryogenic dewar 4 is filled with liquid nitrogen. The test train 1 is connected to the mover after finishing filling liquid nitrogen. The test train and the mover are transferred into the transition section 14. The first isolation door 13 is closed.

(S5) A first connecting valve 24 between the transition section 14 and the vacuum maintaining system 18 is opened. The transition section 14 is vacuumized to reach the second target pressure.

(S6) The second isolation door 19 is opened. A second connecting valve 25 between the vacuum section 20 and the vacuum maintaining system 18 is opened. A pressure in the evacuated tube 6 is adjusted to the first target pressure and the pressure in the evacuated tube is kept at the first target pressure by the vacuum maintaining system.

(S7) The test and communication system is started to perform time synchronization.

(S8) The test and communication system is started to perform acquisition of the test data.

(S9) The traction-braking system is started for controlling the test train 1 to accelerate, travel at a constant speed, and decelerate.

(S10) The test data is saved. The traction-braking system and the test and communication system are turned off in turn.

(S11) A multifunctional testing vehicle is controlled to return the test train 1 to the transition section 14.

(S12) The second isolation door 19 is closed. The transition section 14 is repressurized to atmospheric pressure. Then, the first isolation door 13 is opened. The test train 1 moves from the transition section 14 to the preparation section 17.

(S13) If there is no other test to be conducted in a preset period of time, the first connecting valve 24 and the second connecting valve 25 are closed, and the vacuum maintaining system 18 is closed to restore the pressure in the evacuated tube 6.

(S14) When the temperature inside the evacuated tube 6 reaches the ambient temperature, the dynamic simulation test platform is closed.

Described above are merely preferred embodiments of the disclosure, which are not intended to limit the disclosure. It should be understood that any modifications and replacements made by those skilled in the art without departing from the spirit of the disclosure should fall within the scope of the disclosure defined by the appended claims.

What is claimed is:

1. A dynamic simulation test platform for evacuated tube magnetic levitation (maglev) transportation, comprising:
   an evacuated tube;
   a vacuum maintaining system;
   a motor supporting platform; and
   a test train;
   wherein a first end of the evacuated tube is provided with a first isolation door, and a second end of the evacuated tube is closed; a second isolation door is provided inside the evacuated tube; and the second isolation door is configured to divide the evacuated tube into a transition section and a vacuum section;
   the vacuum maintaining system is connected to the transition section and the vacuum section;
   the motor supporting platform is provided in the evacuated tube, and extends out of the transition section; and the motor supporting platform is provided with a stator and a permanent-magnet track;
   a mover and a cryogenic dewar are provided at a bottom of the test train; a superconducting bulk is provided inside the cryogenic dewar; the stator is configured to be energized to generate a driving force with the mover to drive the test train forward; and the superconducting bulk is configured to cooperate with the permanent-magnet track to generate a levitation force; and
   the dynamic simulation test platform is configured for:
   performing a manual inspection on hardware equipment; and vacuumizing the evacuated tube to reach a first target pressure;
   starting an energy storage device of a traction-braking system to perform energy storage until the energy storage is completed;
   feeding liquid nitrogen to the cryogenic dewar; connecting the test train to the mover after completing the feeding of liquid nitrogen; transferring the test train and the mover to the transition section; and closing the first isolation door;
   opening a first connecting valve between the transition section and the vacuum maintaining system; and vacuumizing the transition section to reach a second target pressure;
   opening the second isolation door; opening a second connecting valve between the vacuum section and the vacuum maintaining system; and adjusting a pressure in the evacuated tube to the first target pressure and keeping the pressure in the evacuated tube at the first target pressure;
   starting a test and communication system to perform time synchronization and acquisition of test data;
   starting the traction-braking system for controlling the test train to accelerate, travel at a constant speed, and decelerate;
   saving the test data; turning off the traction-braking system and the test and communication system in turn;
   controlling a multifunctional testing vehicle to return the test train to the transition section;
   closing the second isolation door; restoring a pressure of the transition section to atmospheric pressure; opening the first isolation door; and moving the test train out of the transition section to a preparation section;
   if there is no other test to be conducted in a preset period of time, closing the first connecting valve and the second connecting valve; and closing the vacuum maintaining system to restore the pressure in the evacuated tube to the atmospheric pressure; and closing the dynamic simulation test platform when a temperature in the evacuated tube reaches an ambient temperature.

2. The dynamic simulation test platform of claim 1, wherein the motor supporting platform is provided with two motor brackets; the motor supporting platform is fixedly connected to the evacuated tube; one of the two motor brackets is disposed on a first side of the motor supporting platform, and the other of the two motor brackets is disposed on a second side of the motor supporting platform; a first gap is provided between the two motor brackets; the number of the stator is two; one of two stators is provided on a sidewall of one of the two motor brackets, and the other of the two stators is provided on a sidewall of the other of the two motor brackets; the two stators are located in the first gap; the mover is located between the two stators; and a second gap is provided between the mover and each of the two stators.

3. The dynamic simulation test platform of claim 2, wherein each of the two stators comprises a stator core and a stator winding; the stator core is fixedly connected to a corresponding one of the two motor brackets; the stator winding is fixedly connected to the stator core; and the stator winding is located in the first gap.

4. The dynamic simulation test platform of claim 2, further comprising:
a position detecting device;
wherein the position detecting device is provided on one of the two motor brackets and located in the first gap.

5. The dynamic simulation test platform of claim 1, wherein the mover is made of permanent magnets.

6. The dynamic simulation test platform of claim 1, wherein the transition section is made of a transparent material; and the vacuum section is made of a metal material.

7. The dynamic simulation test platform of claim 1, further comprising:
three bases;
wherein the three bases are fixedly connected to ground; an end of each of the three bases away from the ground is provided with a tube supporting seat; two of three tube supporting seats are connected to the first isolation door and the second isolation door, respectively; and a remaining one of the three tube supporting seats is fixedly connected to a closed end of the evacuated tube.

8. The dynamic simulation test platform of claim 1, wherein the permanent-magnet track is arranged in a Halbach array.

9. The dynamic simulation test platform of claim 1, wherein the step of performing a manual inspection on hardware equipment; and vacuumizing the evacuated tube to reach a first target pressure is performed through steps of:
at 48 hours before test, performing the manual inspection on the hardware equipment;
at 24 hours before the test, closing the first isolation door; starting the vacuum maintaining system to vacuumize the evacuated tube until the pressure in the evacuated tube reaches the first target pressure; and keeping the evacuated tube at the first target pressure; and
at 2 hours before the test, based on a monitoring system, setting test parameters; checking equipment data; and setting an interlocked operation according to test requirements.

* * * * *